US 9,056,631 B2

(12) United States Patent
Nakamori (10) Patent No.: US 9,056,631 B2
(45) Date of Patent: Jun. 16, 2015

(54) BATTERY CASE

(75) Inventor: Yoji Nakamori, Gamagori (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 241 days.

(21) Appl. No.: 12/964,229

(22) Filed: Dec. 9, 2010

(65) Prior Publication Data

US 2011/0143179 A1  Jun. 16, 2011

(30) Foreign Application Priority Data

Dec. 10, 2009  (JP) .................................. 2009-281039

(51) Int. Cl.
| | |
|---|---|
| *H01M 2/10* | (2006.01) |
| *B62D 29/04* | (2006.01) |
| *B60K 1/04* | (2006.01) |
| *H01M 10/6563* | (2014.01) |

(52) U.S. Cl.
CPC ....... *B62D 29/041* (2013.01); *B60K 2001/0405* (2013.01); *H01M 2220/20* (2013.01); *B60K 1/04* (2013.01); *B60K 2001/0438* (2013.01); *H01M 2/1077* (2013.01); *H01M 2/1083* (2013.01); *H01M 10/5067* (2013.01)

(58) Field of Classification Search
USPC .......................................................... 429/99
See application file for complete search history.

(56) References Cited

U.S. PATENT DOCUMENTS

| | | | | |
|---|---|---|---|---|
| 2,933,548 | A | * | 4/1960 | Walker .......................... 429/100 |
| 5,620,057 | A | | 4/1997 | Klemen et al. |
| 5,639,571 | A | * | 6/1997 | Waters et al. .................... 429/71 |
| 5,806,618 | A | * | 9/1998 | Luode .......................... 180/68.5 |
| 6,227,322 | B1 | * | 5/2001 | Nishikawa ................... 180/68.5 |
| 7,128,999 | B1 | * | 10/2006 | Martin et al. ................... 429/99 |
| 2005/0260488 | A1 | * | 11/2005 | Zhou et al. ..................... 429/99 |
| 2006/0166087 | A1 | * | 7/2006 | Ogata et al. ................... 429/153 |
| 2008/0318119 | A1 | * | 12/2008 | Watanabe et al. ............... 429/99 |
| 2009/0186266 | A1 | | 7/2009 | Nishino et al. | |

FOREIGN PATENT DOCUMENTS

| | | |
|---|---|---|
| EP | 1 852 925 A1 | 11/2007 |
| JP | 3896607 B2 | 3/2007 |
| WO | WO 2009/066661 A1 | 5/2009 |

* cited by examiner

*Primary Examiner* — Ula C Ruddock
*Assistant Examiner* — Matthew Van Oudenaren
(74) *Attorney, Agent, or Firm* — Birch, Stewart, Kolasch & Birch, LLP (57) ABSTRACT

A battery case comprises: a battery tray formed from a resin, the battery tray having a bottom wall on which batteries are mounted, and a peripheral side wall which surrounds the periphery of the bottom wall; and a battery cover which covers the battery tray. A flange portion is provided on the upper surface of the peripheral side wall, and a metallic housing-shaped frame is provided beside the outer wall of the battery tray. The flange portion and the battery cover are fixed onto the upper surface of the metallic housing-shaped frame by fastening members.

5 Claims, 6 Drawing Sheets

BATTERY CASE

The entire disclosure of Japanese Patent Application No. 2009-281039 filed Dec. 10, 2009 is expressly incorporated by reference herein.

BACKGROUND OF THE INVENTION

1. Field of the Invention

This invention relates to a battery case.

2. Description of the Related Art

With an electric vehicle, an in-vehicle battery has had a considerable weight, and has occupied a considerable loading space. Thus, it has been common practice to dispose a dedicated battery frame under the floor of a vehicle body, and load a plurality of batteries inside the battery frame so that the batteries are accommodated in an enclosed state from the floor of the vehicle body (see, for example, Patent Document 1).

CITATION LIST

Patent Literature

Patent Document 1 Japanese Patent No. 3896607 (claim 1, FIG. 2, etc.)

SUMMARY OF THE INVENTION

Technical Problem

In Patent Document 1, the battery frame is composed of an outer frame, and a shielding frame fitted in and fixed to the outer frame. The peripheral side wall of the shielding frame is constructed to extend along the inner wall surface of the outer frame. An adhesive is poured into a clearance between the peripheral side wall of the shielding frame and the inner wall surface of the outer frame to fix them to each other. With this structure, the provision of the outer frame can enhance the rigidity of the shielding frame.

However, the adhesive is poured into the clearance between the peripheral side wall of the shielding frame and the inner wall surface of the outer frame. Thus, the adhesive may fail to extend throughout, posing the problem of poor enclosing or sealing properties. Since it is attempted to ensure enclosure or sealing by the above-mentioned configuration, moreover, the problem arises that there is difficulty in adhering the shielding frame and the outer frame while positioning them with high accuracy. Furthermore, the sealing properties by the adhesive are difficult to check and confirm visually, so that their inspection is difficult.

The present invention has been accomplished to solve the problems of the conventional technologies as discussed above. It is an object of the invention to provide a battery case having high strength, high rigidity, and high seal.

Solution to Problem

The present invention provides a battery case, comprising: a battery tray formed from a resin; a bottom wall on which batteries are mounted; a peripheral side wall which surrounds a periphery of the bottom wall; a flange portion provided on an upper surface of the peripheral side wall; a metallic housing-shaped frame provided beside an outer wall of the battery tray; and a battery cover which covers the battery tray; wherein the flange portion and the battery cover being fixed onto an upper surface of the metallic housing-shaped frame by fastening members.

In this aspect of the invention, the metallic housing-shaped frame is provided beside the outer wall of the battery tray. Thus, the strength and rigidity of the battery tray can be enhanced. In addition, the flange portion and the battery cover are fixed onto the upper surface of the metallic housing-shaped frame by the fastening members. Hence, the deformation of the battery tray can be suppressed, and its sealability can be kept high.

It is preferred that the metallic housing-shaped frame be hollow inside. Since it is hollow, the impact energy of side impact or the like can be absorbed efficiently, and the batteries mounted can be protected. Weight reduction is also possible.

The peripheral side wall is preferably inclined so that an opening of the battery tray formed by being surrounded with the peripheral side wall narrows toward the bottom wall. Since the peripheral side wall is inclined, the housing-shaped frame is easily fitted to the battery tray, and production is easy.

As another preferred aspect of the invention, the battery cover includes a ceiling wall covering the battery tray, a cover-side peripheral side wall surrounding a periphery of the ceiling wall and a cover-side flange portion provided on a lower surface of the cover-side peripheral side wall; wherein the cover-side flange portion is fixed, together with the flange portion, to the upper surface of the metallic housing-shaped frame by the fastening members.

Advantageous Effects of Invention

According to the battery case of the present invention, the excellent effects can be exhibited that the strength and rigidity of the battery case can be retained, and its sealability is high.

DETAILED DESCRIPTION OF THE INVENTION

Embodiment 1

Embodiment 1 of the present invention will now be described.

Figure 1:
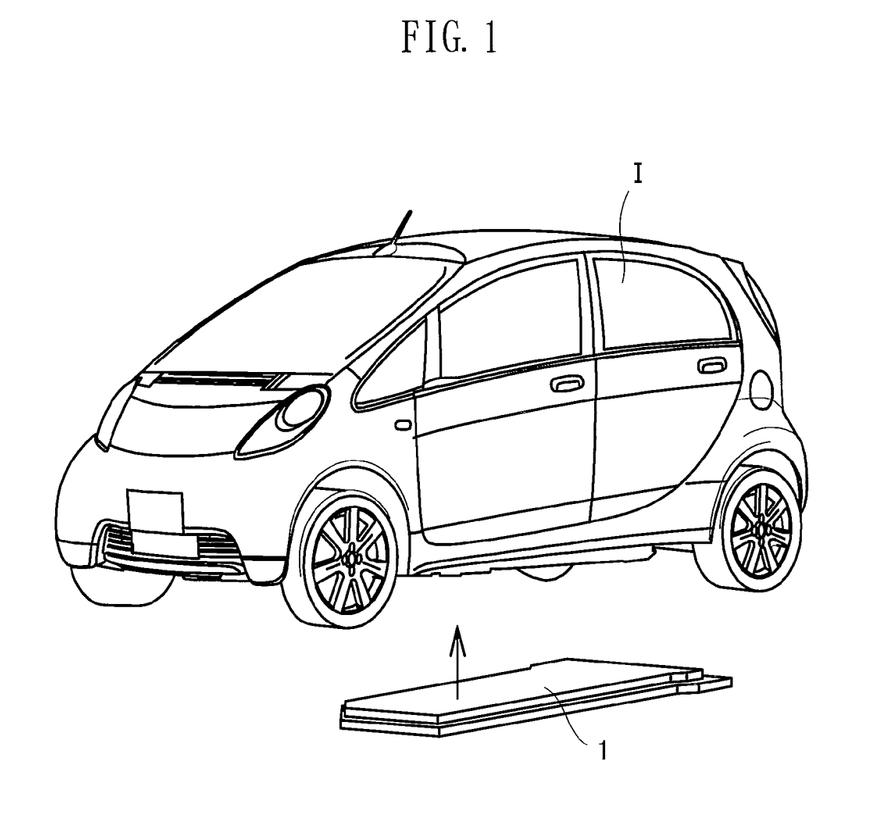
FIG. 1 is a schematic perspective view of an electric vehicle for showing the installation of a battery case.

A battery case is intended to accommodate batteries within an accommodation space formed inside. As shown in FIG. 1, for example, a battery case 1 is installed in a lower part of the vehicle body of an electric vehicle 1 by a member for battery installation (not shown) to supply electricity to a motor or the like of the electric vehicle 1. The configuration of the battery case 1 will be described in detail below using FIGS. 2 to 4.

Figure 3A:
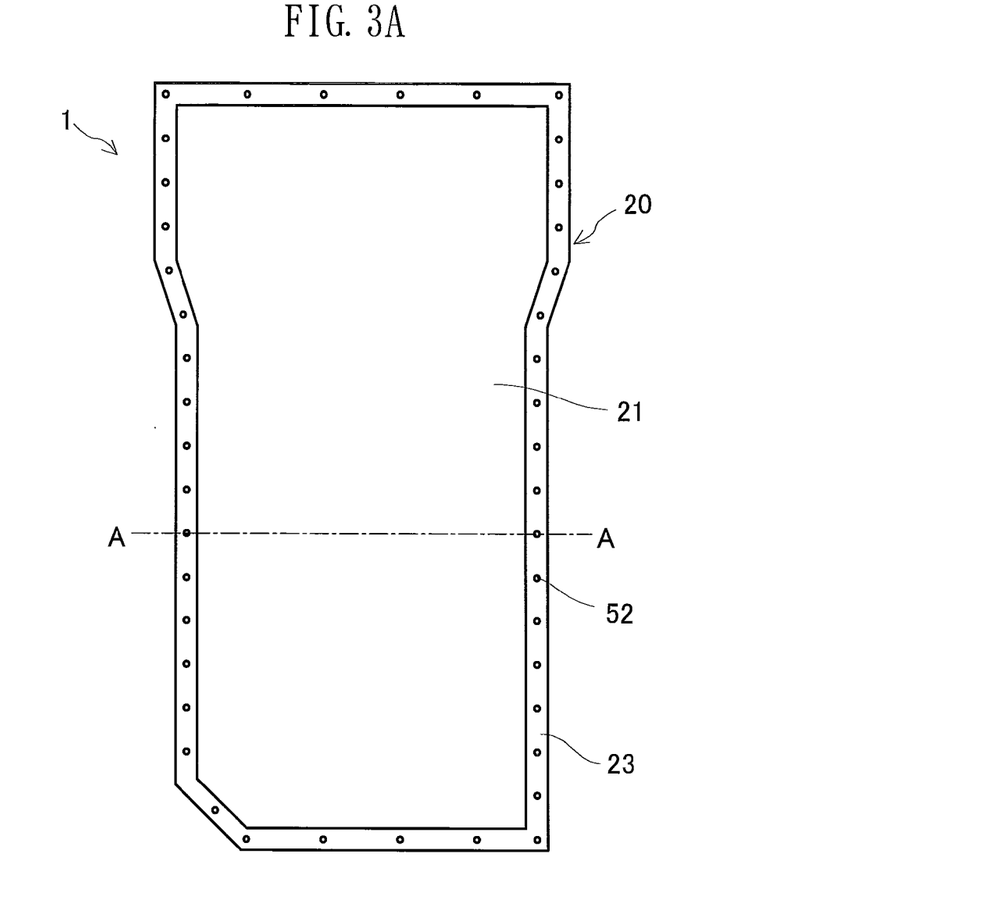
FIGS. 3A and 3B are a top plan view (FIG. 3A, and a sectional view taken along line A-A in FIG. 3A (FIG. 3B).
Figure 3B:
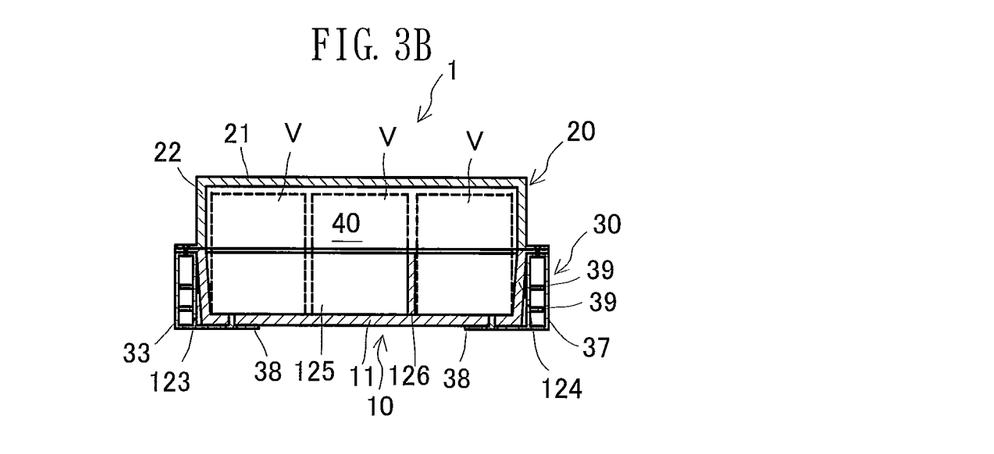

Concretely, the battery case 1 has a battery tray 10 loaded with a plurality of batteries V (see FIG. 3B, a battery cover 20 provided on the upper surface side of the battery tray 10 for sealing the battery tray 10, and a housing-shaped frame 30 for covering the outer periphery of the battery tray 10 and reinforcing the battery tray 10.

Figure 4:
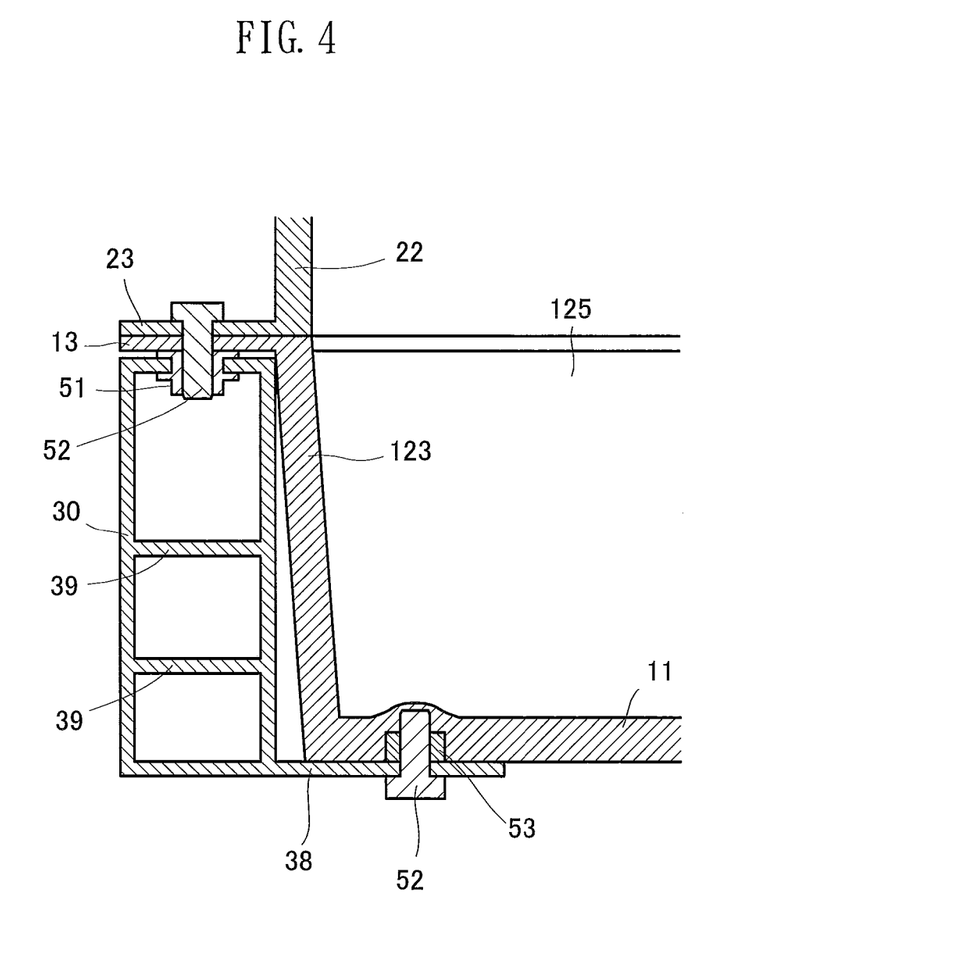
FIG. 4 is a partly enlarged view of FIG. 3B.

The battery tray 10 constitutes a lower part of the battery case 1, and is composed of a thin-walled (thickness 3 to 5 mm) resin. The battery tray 10 has a polygonal bottom wall 11. A peripheral side wall 12 is provided at the peripheral edge of the bottom wall 11. A space defined by the bottom wall 11 and the peripheral side wall 12 constitutes a lower part of an accommodation space 40 for the batteries V. As shown in FIG. 4, the peripheral side wall 12 of the battery tray 10 is provided in an inclined state so that an angle formed by the bottom wall 11 and the peripheral side wall 12 will be an obtuse angle, when viewed in section. That is, an opening formed by the surrounding peripheral side wall 12 narrows with approach toward the bottom wall 11.

The peripheral side wall 12 consists of a front side wall 121 having a bending portion bent toward the forward direction of the vehicle, a rear side wall 122 opposing the front side wall 121, and a left side wall 123 and a right side wall 124 connecting the front side wall 121 and the rear side wall 122.

Figure 2:
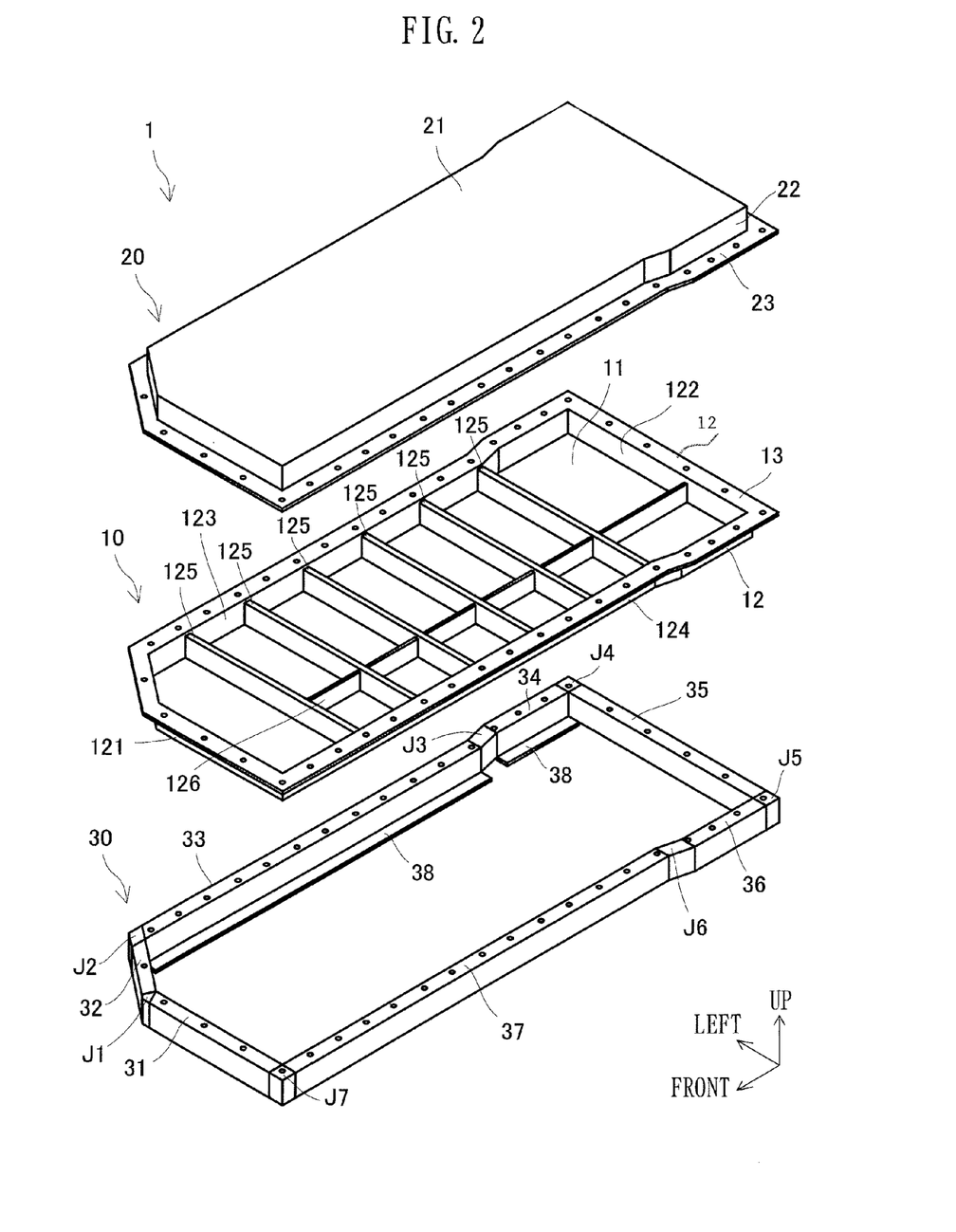
FIG. 2 is an exploded perspective view of the battery case.

The interior of the battery tray 10 surrounded by the peripheral side wall 12 is provided with a plurality of (for example, six, in the drawing) first partition walls 125 extending in the lateral direction of the battery tray 10 between the left side wall 123 and the right side wall 124. A second partition wall 126 is provided in the longitudinal direction of the battery tray 10 to extend between the foremost first partition wall 125 and the rear side wall 122. As shown in FIG. 2, the batteries V are loaded into spaces demarcated by the first partition walls 125 and the second partition wall 126.

At an end part (opening end part) of the peripheral side wall 12, a flange portion 13 is provided extendedly outwardly. The flange portion 13 is provided to parallel the floor surface.

The battery cover 20 constitutes an upper part of the battery case 1. The battery cover 20 has a ceiling wall 21. The shape of the ceiling wall 21 of the battery cover 20 is nearly the same as the shape of the bottom wall 11 of the battery tray 10, as viewed in plan view. At the peripheral edge of the ceiling wall 21, a cover-side peripheral side wall 22 is provided. A space defined by the cover-side peripheral side wall 22 and the ceiling wall 21 constitutes an upper part of the accommodation space 40 for the batteries V. At an end part of the cover-side peripheral side wall 22, a cover-side flange portion 23 is provided extendedly outwardly. The cover-side flange portion 23 is provided parallel to the floor surface. The width of the cover-side flange portion 23 is the same as the width of the flange portion 13 of the battery tray 10. The battery cover 20 may be provided, for example, with an introduction device or the like for introducing a cooling wind for maintaining the temperature within the battery case at a constant value, although this is not illustrated in the present embodiment.

The housing-shaped frame 30 is provided on the outer periphery of the peripheral side wall 12 of the battery tray 10. The housing-shaped frame 30 comprises a plurality of straight metal frames. That is, the housing-shaped frame 30 has a foremost frame portion 31 located on the foremost side, and a front frame portion 32 connected to the left side of the foremost frame portion 31 via a joint member J1. A left frame portion 33 is connected to the other end side of the front frame portion 32 via a joint member J2. A posterior left frame portion 34 is connected to the other end side of the left frame portion 33 via a joint member J3. A rear frame portion 35 is connected to the posterior left frame portion 34 via a joint member J4 so as to parallel the foremost frame portion 31. A posterior right frame portion 36 is connected to the other end side of the rear frame portion 35 via a joint member J5 so as to parallel the posterior left frame portion 34. A right frame portion 37 is connected to the other end side of the posterior right frame portion 36 via a joint member J6 so as to parallel the left frame portion 33. The foremost frame portion 31 is connected to the other end side of the right frame portion 37 via a joint member 17. As seen here, the housing-shaped frame 30 is assembled from the plurality of straight metal frames and the joint members J1 to J7 so that these parts form a housing-shaped structure surrounding the peripheral side wall 12 of the battery tray 10. Frame-side flange portions 38 extend inwardly on the underside of the left frame portion 33, the posterior left frame portion 34, the right frame portion 37, and the posterior right frame portion 36 of the housing-shaped frame 30.

The width of the upper surface of the housing-shaped frame 30 configured as above is the same as the width of the flange portion 13 of the battery tray 10. Each of the metal frames constituting the housing-shaped frame 30 is formed by extrusion. As shown in FIG. 3B and FIG. 4, each metal frame is hollow inside, and beam portions 39 are provided throughout its lateral dimension in the vicinity of its middle.

The above-mentioned respective members are fixed as will be explained below.

As described above, the housing-shaped frame 30 is mounted from below on the external wall side of the battery tray 10. That is, the battery tray 10 is fitted into the housing-shaped frame 30, and the flange portion 13 of the battery tray 10 is disposed on the upper surface of the housing-shaped frame 30. Then, the battery cover 20 is mounted on the upper side of the battery tray 10. The cover-side flange portion 23 of the battery cover 20 is disposed on the flange portion 13 of the battery tray 10. The cover-side flange portion 23 installed on the flange portion 13, and the flange portion 13 are fixed on the housing-shaped frame 30 by blind nuts 51 and bolts 52. Concretely, the blind nuts 51 are provided at predetermined positions of the housing-shaped frame 30, and the bolts 52 are inserted into the blind nuts 51 from beside the cover-side flange portion 23, whereby the cover-side flange portion 23, the flange portion 13, and the housing-shaped frame 30 are fixed together.

When they are fixed in this manner, the accommodation space 40 is formed inside the battery case 1, namely, between the battery cover 20 and the battery tray 10. This accommodation space 40 is an enclosed space. The batteries V are accommodated, in an enclosed state, within the accommodation space 40.

The housing-shaped frame 30 and the battery tray 10 are fixed also in a vertical direction, because the frame-side flange portions 38 of the housing-shaped frame 30 and the bottom wall 11 of the battery tray 10 are fixed together. Concretely, bolts 52 are fastened, from beside the bottom wall 11, to insert nuts 53 provided in the bottom wall 11, whereby the frame-side flange portions 38 and the bottom wall 11 of the battery tray 10 are fixed together.

The effects of the battery case 1 of the above-described configuration will be described.

In the present embodiment, the housing-shaped frame 30 is provided on the outer peripheral side of the battery tray 10, whereby the rigidity of the battery tray 10 comprising the thin-walled resin can be enhanced, and the battery case 1 can attain desired strength and rigidity.

In the present embodiment, the battery tray 10 is entirely composed of the thin-walled resin. Thus, in comparison with a case where the battery tray is composed of a thick-walled resin (thickness of the order of 20 mm) or where metal frames are inserted in the battery tray, a light weight can be realized, and cost reduction can be achieved. If a battery case comprising a thick-walled resin is to be constructed, for example, it is conceivable that a portion unnecessary for ensuring the shape will be removed (excess metal cutaway) for weight reduction.

However, this removal would result in decreased strength and rigidity. Hence, it is preferred to provide the housing-shaped frame 30 comprising metal around the battery tray 10 comprising the thin-walled resin, as in the present embodiment.

The battery tray 10 comprising the thin-walled resin as stated above is formed by injection molding. If such a battery tray is constituted by a thick-walled resin, it is formed by compression molding with a long molding time. In producing the battery tray 10 of the present embodiment, on the other hand, it is formed by injection molding with a short molding time as mentioned above, so that the production time is shortened and the production efficiency is increased.

In the present embodiment, In the battery cover 20, the battery tray 10, and the housing-shaped frame 30, the flange portion 13 and the cover-side flange portion 23 fixed by the upper surface of the housing-shaped frame 30. Thus, deformation of the flange portion 13 and the cover-side flange portion 23 during fastening of the blind nut 51 can be suppressed. Since the deformation is suppressed, the accommodation space 40 defined between the battery cover 20 and the battery tray 10 is reliably enclosed or sealed. Moreover, being fixed by the blind nuts 51 makes it possible to maintain the stability of the seal, namely, to keep ensuring the enclosing or sealing properties, even under an impact or the like, in comparison with the fixing by an adhesive. An inspection of whether the seal is reliable or not can be made visually, and can be easily conducted, unlike an inspection in the case of fixing with an adhesive.

The housing-shaped frame 30 itself is made of a metal, and is formed to be hollow. Thus, the housing-shaped frame 30 can retain the strength and rigidity of the battery case 1, and can render it lightweight.

Furthermore, the housing-shaped frame 30 and the battery tray 10 are fixed not only at the flange portion 13, but also at the frame-side flange portions 38. Thus, the housing-shaped frame 30 can be reliably fixed to the battery tray 10 comprising the thin-walled resin, and can thereby enhance its strength and rigidity. In this case, moreover, the bolts 52 are fastened from beside the bottom wall 11, whereby the bolt 52 does not penetrate the bottom wall 11 at the site where the bolt 52 opposes the bottom wall 11. Thus, the sealed or enclosed state of the accommodation space 40 can be ensured.

In the present embodiment, the peripheral side wall 12 is inclined, so that the battery tray 10 is easy to fit into the housing-shaped frame 30 from above. Thus, the battery case is easy and simple to produce.

That is, according to the present embodiment, the lower part of the battery case 1 is composed of the battery tray 10 and the housing-shaped frame 30. By so doing, weight reduction is achieved, and rigidity is ensured. Moreover, the structure is so simple that sealing can be achieved without using an adhesive. Thus, sealability can be improved, and the stability of the seal can be increased.

Embodiment 2

Figure 5:
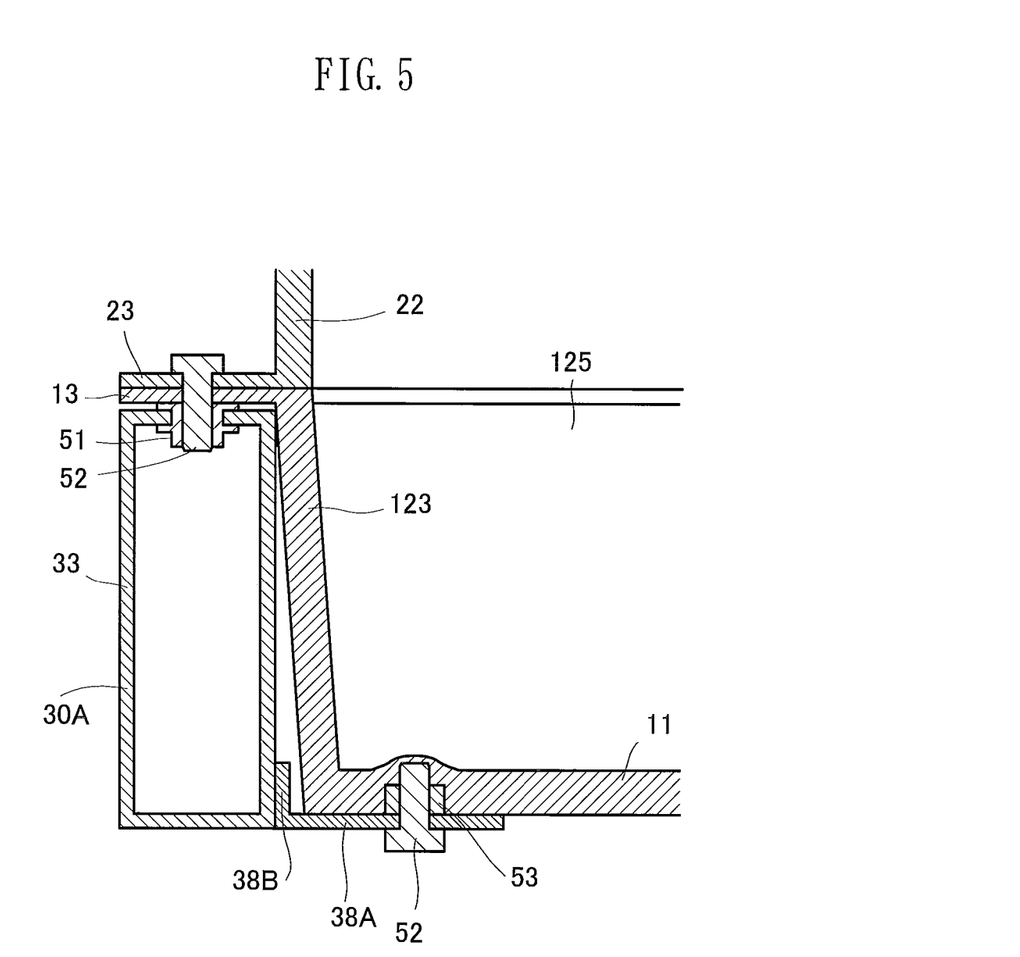
FIG. 5 is a partially enlarged sectional view according to Embodiment 2.

Embodiment 2 of the present invention will be described by reference to FIG. 5. In FIG. 5, the same members as those in FIGS. 1 to 4 are assigned the same numerals as in FIGS. 1 to 4.

In Embodiment 1, each metal frame constituting the housing-shaped frame is provided with the beam portions 39 (see FIG. 4) throughout its lateral dimension in the vicinity of its middle. In the present embodiment, by contrast, each metal frame constituting a housing-shaped frame 30A is not provided with the beam portions. In this case, the battery case 1 can be rendered more lightweight than that in Embodiment 1.

The housing-shaped frame 30A in the present embodiment can be constructed of a square steel pipe, for example. In Embodiment, moreover, the frame-side flange portions are integrated with the housing-shaped frame. In the present embodiment, however, frame-side flange portions 38A may be separate from the housing-shaped frame 30A. In this case, the housing-shaped frame 30A and the frame-side flange portions 38A are joined together, between the wall surfaces of the housing-shaped frame 30A, which face the battery tray 10, and rising portions 38B extending from end parts of the frame-side flange portions 38A, for example, by welding.

In the present embodiment, none of the respective metal frames constituting the housing-shaped frame 30A are provided with the beam portions. However, there may be a configuration in which only some of the respective metal frames constituting the housing-shaped frame 30A are not provided with the beam portions.

Embodiment 3

Figure 6:
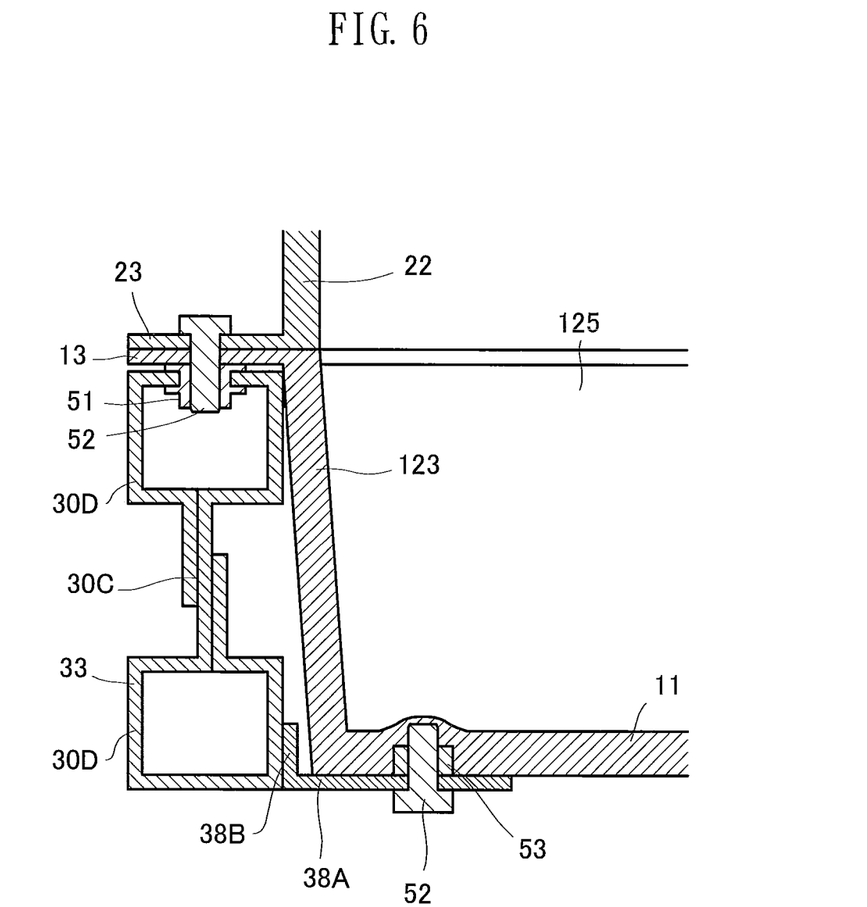
FIG. 6 is a partially enlarged sectional view according to Embodiment 3.

Embodiment 3 of the present invention will be described by reference to FIG. 6. In FIG. 6, the same members as those in FIGS. 1 to 5 are assigned the same numerals as in FIGS. 1 to 5.

In Embodiment 1, the hollow metal frames are joined to constitute the housing-shaped frame 30. In the present embodiment, a housing-shaped frame 30C is constituted by roll-formed sheet metals. That is, sheet metals are roll-formed such that two rectangular portions 30D of a nearly rectangular shape, as viewed in cross section, are formed. Then, near the middle part between the two rectangular portions 30D, the widthwise central part and the end part of the sheet metals are joined together by spot welding. That is, the housing-shaped frame 30C is formed in such a state that two frames are joined together in the vertical direction. By adopting such a form, the housing-shaped frame 30C can retain strength and rigidity, and can be produced relatively easily and simply.

In this case as well, the frame-side flange portions 38A and the housing-shaped frame 30C are rendered separate objects, as in Embodiment 2. The housing-shaped frame 30C and the frame-side flange portions 38A are joined together, between the wall surfaces of the housing-shaped frame 30C, which face the battery tray 10, and rising portions 38B extending from end parts of the frame-side flange portions 38A, for example, by welding.

Other embodiments will be described below.

In each of the above-described embodiments, the installation of the battery case 1 in the electric vehicle 1 has been described, but this is not limitative. The battery case 1 may be put to uses other than an electric vehicle.

In the above-described embodiments, the blind nuts 51, the insert nuts 53 and the bolts 52 are used as fastening members. However, the fastening members are not limited to them, and weld nuts, weld bolts, etc. may be used. Alternatively, bolts and nuts are not limitative, but clips and press plates, for example, may be combined, if both can be fixed.

To stabilize the sealability or closed state of the battery case 1 further, a sealing material (for example, a cottony gasket) may be inserted between the flange portion 13 of the battery tray 10 and the cover-side flange portion 23 of the battery cover 20.

The shape of the battery case 1 is determined, as appropriate, by the shape of the vehicle, and is not limited to those mentioned above. In the above embodiments, for example, the battery cover 20 has the cover-side peripheral side wall 22, but may be a planar cover, for example.

INDUSTRIAL APPLICABILITY

The battery case of the present invention has high degree of strength, high rigidity, and high sealability. Thus, it can be utilized, for example, as an accommodation case for batteries in the field of vehicle production.

REFERENCE SIGNS LIST

10 Battery tray
11 Bottom wall
12 Peripheral side wall
13 Flange portion
20 Battery cover
21 Ceiling wall
22 Cover-side peripheral side wall
23 Cover-side flange portion
24 Accommodation space
30 Housing-shaped frame
38 Frame-side flange portion
39 Beam portion
51 Blind nut

The invention claimed is:

1. A battery case, comprising:
a battery tray formed from a resin and including;
   a bottom wall on which batteries are mounted,
   a peripheral side wall which extends upward from all peripheral sides of the bottom wall and surrounds the bottom wall, the peripheral side wall including opposing right and left side walls and opposing front and rear side walls that extend between the opposing right and left side walls, and
   a tray-side flange portion extending outward from an upper-most end of the peripheral side wall, the tray-side flange portion being a single continuous flange that surrounds the entire peripheral side wall;
a metallic housing-shaped frame provided outside the battery tray and adjacent to the peripheral side wall, the metallic housing-shaped frame surrounding the entire peripheral side wall; and
a battery cover which covers the battery tray and including a cover-side flange portion that opposes the tray-side flange portion, wherein
the tray-side flange portion and the cover-side flange portion are placed on and fixed to an upper surface of the metallic housing-shaped frame by first fastening members extending in a downward direction,
wherein the metallic housing-shaped frame includes a frame-side flange portion, extending, along the bottom wall of the battery case, from the metallic housing-shaped frame provided on an outer periphery of the peripheral side wall of the battery tray,
a bottom surface of the metallic housing-shaped frame and a bottom surface of the frame-side flange portion forming a common surface,
wherein the frame-side flange portion is secured to the bottom wall by second fastening members extending in an upward direction, and
wherein the battery tray is pinched between the battery cover and the metallic housing-shaped frame under force by the first and second fastening members.

2. The battery case according to claim 1, wherein the metallic housing-shaped frame includes a plurality of frame portions, each frame portion defining therein a hollow space.

3. The battery case according to claim 1, wherein the peripheral side wall is inclined so that an opening of the battery tray formed by being surrounded with the peripheral side wall narrows toward the bottom wall.

4. The battery case according to claim 1, wherein
the battery cover includes a ceiling wall covering the battery tray, a cover-side peripheral side wall surrounding a periphery of the ceiling wall and the cover-side flange portion provided on a lower surface of the cover-side peripheral side wall, and wherein
the cover-side flange portion is fixed, together with the tray-side flange portion, to the upper surface of the metallic housing-shaped frame by the first fastening members.

5. The battery case according to claim 2, wherein the metallic housing-shaped frame includes, in the hollow space, a beam portion that extends between a pair of opposing walls.

* * * * *